US010313652B1

(12) United States Patent
Falstrup et al.

(10) Patent No.: US 10,313,652 B1
(45) Date of Patent: Jun. 4, 2019

(54) CUBIC OR SPHERICAL MAPPED CONTENT FOR PRESENTATION OF PRE-RENDERED IMAGES VIEWED FROM A FIXED POINT OF VIEW IN HTML, JAVASCRIPT AND/OR XML FOR VIRTUAL REALITY APPLICATIONS

(71) Applicant: Relay Cars LLC, Rancho Dominguez, CA (US)

(72) Inventors: David Falstrup, Rancho Dominguez, CA (US); Thom Denick, Rancho Dominguez, CA (US); Pat Hadnagy, Los Angeles, CA (US); Alex McClain, Rancho Dominguez, CA (US); Jason Green, Rancho Dominguez, CA (US)

(73) Assignee: Relay Cars LLC, Rancho Dominguez, CA (US)

( * ) Notice: Subject to any disclaimer, the term of this patent is extended or adjusted under 35 U.S.C. 154(b) by 0 days.

(21) Appl. No.: 15/678,435

(22) Filed: Aug. 16, 2017

Related U.S. Application Data

(60) Provisional application No. 62/376,719, filed on Aug. 18, 2016.

(51) Int. Cl.
*H04N 13/117* (2018.01)
*H04N 5/232* (2006.01)
*G06F 3/0481* (2013.01)
*G06F 3/0482* (2013.01)
*G06F 3/0484* (2013.01)
*H04N 13/133* (2018.01)
*H04N 13/204* (2018.01)

(52) U.S. Cl.
CPC ......... *H04N 13/117* (2018.05); *G06F 3/0482* (2013.01); *G06F 3/04812* (2013.01); *G06F 3/04817* (2013.01); *G06F 3/04847* (2013.01); *H04N 5/23238* (2013.01); *H04N 13/133* (2018.05); *H04N 13/204* (2018.05)

(58) Field of Classification Search
None
See application file for complete search history.

(56) References Cited

U.S. PATENT DOCUMENTS

| 5,841,439 A | 11/1998 | Pose et al. |
| 6,389,179 B1 | 5/2002 | Katayama et al. |
| 6,795,113 B1 | 9/2004 | Jackson et al. |
| 7,092,014 B1* | 8/2006 | Li .................. H04N 13/243 |
| | | 348/218.1 |
| 8,730,156 B2 | 5/2014 | Weising et al. |
| 9,223,408 B2 | 12/2015 | McArdle et al. |

(Continued)

FOREIGN PATENT DOCUMENTS

| CN | 106846245 A | 6/2017 |
| KR | 101697713 | 1/2017 |

*Primary Examiner* — Heather R Jones
(74) *Attorney, Agent, or Firm* — Socal IP Law Group LLP; Mark Andrew Goldstein

(57) ABSTRACT

Method for the production of immersive virtual reality experiences designed for viewing in HTML using virtual reality head-mounted displays. The layered panorama process disclosed is a cubic or spherical mapped content method for presentation of pre-rendered images viewed from a fixed point of view, This process further discloses a users ability to select graphic user interface elements within the virtual reality environment by a look to activate functionality.

9 Claims, 10 Drawing Sheets

(56) References Cited

U.S. PATENT DOCUMENTS

| 9,288,476 | B2 | | 3/2016 | Sandrew et al. |
| 2007/0277112 | A1 | | 11/2007 | Rossler et al. |
| 2017/0372360 | A1 | * | 12/2017 | Duggal .............. G06Q 30/0255 |

* cited by examiner

CUBIC OR SPHERICAL MAPPED CONTENT FOR PRESENTATION OF PRE-RENDERED IMAGES VIEWED FROM A FIXED POINT OF VIEW IN HTML, JAVASCRIPT AND/OR XML FOR VIRTUAL REALITY APPLICATIONS

CROSS-REFERENCE TO RELATED APPLICATION

This patent application claims priority to Provisional Application No. 62/376,719 filed on Aug. 18, 2016.

BACKGROUND OF THE INVENTION

1. Field of the Invention

The present invention relates to the field of photography of automotive interiors and exteriors. The present invention further relates to the field of digital photography for use in conjunction with software applications for later presentation of the completed photographs in a corresponding medium.

2. Description of the Prior Art

The following 9 patents and published patent applications are the closest prior art known to the inventor.
1. U.S. Pat. No. 5,841,439 issued to Ronald David Pose et al. on Nov. 24, 1998 for "Updating Graphical Objects Based on Object Validity Periods" (hereafter the "Pose Patent");
2. U.S. Pat. No. 6,389,179 issued to Tatsushi Katayama et al. on May 14, 2002 for "Image Combining Apparatus Using a Combining Algorithm Selected Based on an Image Sensing Condition Corresponding to Each Stored Image" (hereafter the "Katayama Patent");
3. U.S. Pat. No. 6,795,113 issued to Laban Phelps Jackson et al. on Sep. 21, 2004 for "Method and Apparatus for the Interactive Display of Any Portion of a Spherical Image" (hereafter the "Jackson Patent");
4. United States Published Patent Application No. 2007/0277112 to Andreas Rossler et al. on Nov. 29, 2007 for "Three-Dimensional User Interface for Controlling a Virtual Reality Graphics System by Function Selection" (hereafter the "Rossler Published Patent Application");
5. U.S. Pat. No. 8,730,156 issued to George Weising et al. on May 20, 2014 for "Maintaining Multiple Views on a Shared Stable Virtual Space" (hereafter the "Weising Patent");
6. U.S. Pat. No. 9,223,408 issued to Terrence Edward McArdle et al. on Dec. 29, 2015 for "System and Method for Transitioning Between Interface Modes in Virtual and Augmented Reality Applications" (hereafter the "McArdle Patent");
7. U.S. Pat. No. 9,288,476 issued to Jared Sandrew et al. on Mar. 15, 2016 for "System and Method for Real-Time Depth Modification of Stereo Images of a Virtual Reality Environment" (hereafter the "Sandrew Patent");
8. Korea Patent No. KR101697713 issued to Tai Heon Choi on Jan. 19, 2017 for "Method and Apparatus for Generating Intelligence Panorama VR (Virtual Reality) Contents" (hereafter the "Choi Korean Patent");
9. Chinese Patent No. CN106846245A issued to Univ Peking Shenzhen Grad School on Jun. 13, 2017 for "Based on the Main View Panoramic Video Mapping Method" (hereafter the "Chinese Patent").

To the best of the present inventors' knowledge, they are not aware of any prior art reference either in any issued patent or published patent application or any publicly disseminated literature which would either identically disclose their present invention under 35 USC § 102, would make their present invention obvious under any combination of references under 35 USC § 103, and to the extent that the present invention includes any software patents, the invention is patent eligible under the provisions as they are currently interpreted under 35 USC § 101. The closest prior art is identified above.

Most previous virtual reality (VR) experiences use 3D models created by game engines to produce a VR experience. While the environment may be immersive, the effect relies on multiple objects in a 3D space and requires high-powered computers normally produced for gaming purposes to render the VR experience. The present invention utilizes the combination of panoramic images created from a unique process coupled with an ability of a user to select elements by a look to activate functionality within an HTML web display. Therefore, the present invention is both different and an improvement over the prior art.

SUMMARY OF THE INVENTION

The present invention is a new, novel, useful and non-obvious method for the production of immersive virtual reality experiences designed for viewing in HTML using virtual reality head-mounted displays. The present invention layered panorama process is a cubic or spherical mapped content method for presentation of pre-rendered images viewed from a fixed point of view by adding unique, novel and non-obvious functionality to third party applications, a method that by mapping/layering all visual elements onto a mono or stereoscopic spherical or cubic panorama surface creates a seamless visual integration.

This novel approach takes assets produced from different sources and at different times and provides a method to combine them into a holistic, immersive experience that appears as a unified, complete world. The novel approach places the viewer/user in a fixed point of view (POV) perspective to experience environments and objects placed within that environment. The placement of two-dimensional images onto a panoramic surface (typically cube or sphere), surrounding the user is novel since all "objects" are placed onto the surface regardless of its apparent distance from the user, and this approach is applied to creation of virtual "worlds" for viewing in head-mounted displays. Both left and right eye images are warped to fit into the panorama, allowing the image elements seen by the user to appear to be at different distances from the user. The visual effects are substantially the same as the effect from placement of 3D objects in a 3D scene at varying distances from the user.

Similarly, objects can appear to move in the apparent 3D space by creating animated frame sequences for left and right eye, warped appropriately to fit the background scene. Images may be layered on top of each other, with frame transparency and each can appear to be at different distances, with corresponding different left-right eye separation.

Because of the fixed Point Of View (POV) approach, all items are placed into panoramic scenes where the virtual world entirely envelops them. The fact that the user can look around and interact with elements in the virtual world makes it very immersive while the fixed POV prevents any sensation of physically moving in a virtual world, an approach that is known to cause nausea and discomfort to many users.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Key Features of the Present Invention:

This method to create an immersive, virtual reality (VR) experience from a fixed point of view, can be built without a requirement to position all elements together in 3D space within a 3D environment, while still allowing for the correct perspective and placements of items in the experience to appear as if all separate items were indeed 3D objects placed in a 3D environment.

Referring to FIGS. 1, 2, 3, and 4, the above described method is achieved through a careful and systematic application of individually produced layered panoramic elements whereby the separate elements of the experience, for example a room left and right 100L and 100R, a vehicle in the room left and right 120L and 120R, graphic elements left and right 140L and 140R, GUI elements left and right 160L and 160R, interior photos left and right 180L and 180R, videos, etc., are produced to fit in layered panoramic images that, when created correctly and viewed in a virtual reality (VR) experience, have the appearance of representing a 3D world with appropriate depth from a fixed perspective.

Key Processes of the Present Invention:

All elements need to be produced to fit within the panoramic experience when brought together in VR application development, regardless of the application engine, such as Unity, Unreal Engine, or others. The development processes are outlined further in the VR Application Development Process below.

Figure 1:
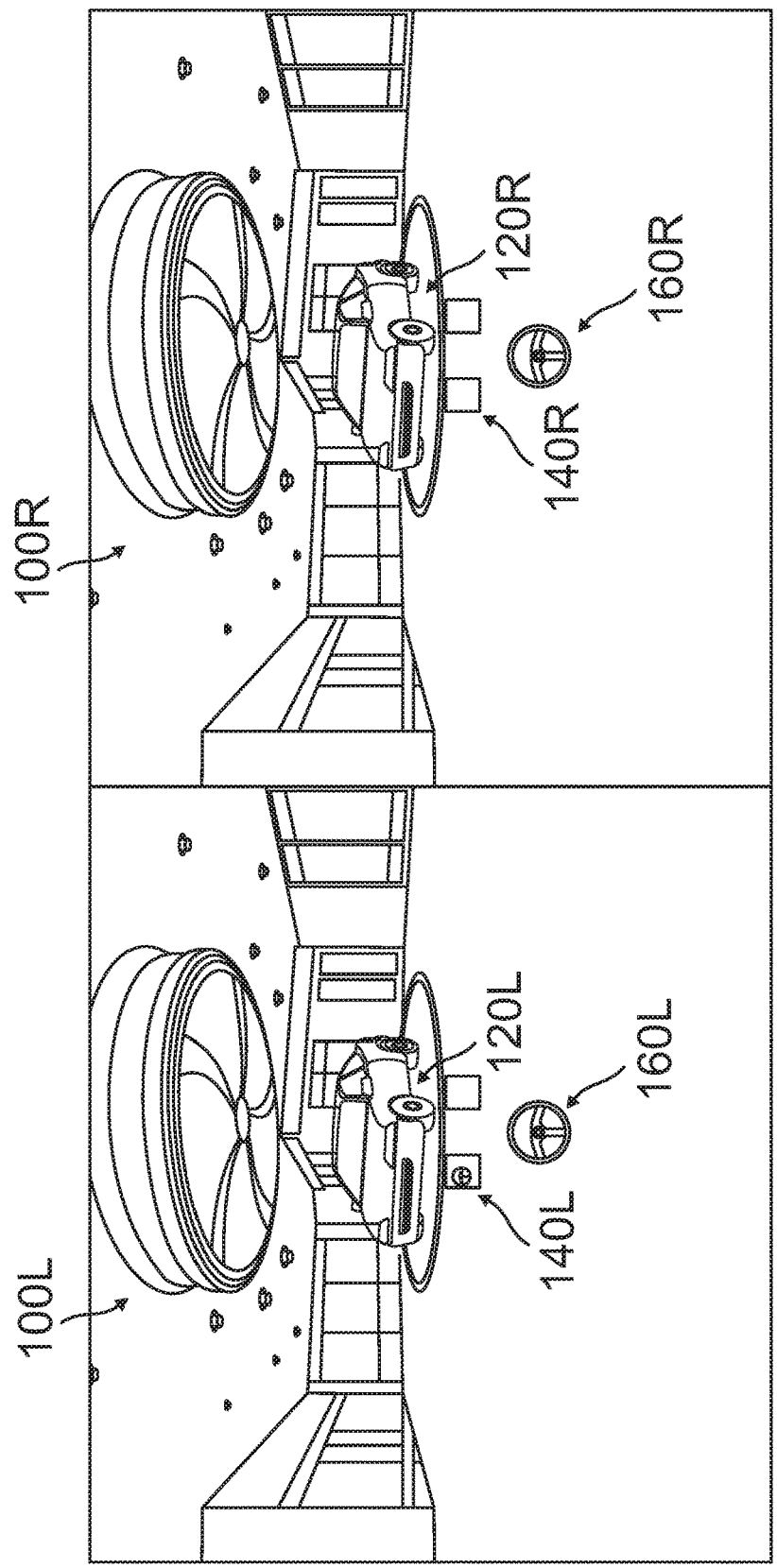
FIG. 1 is a perspective view of the virtual reality environment when viewed from the left eye on the left side and when viewed from the right eye on the right side.
Figure 2:
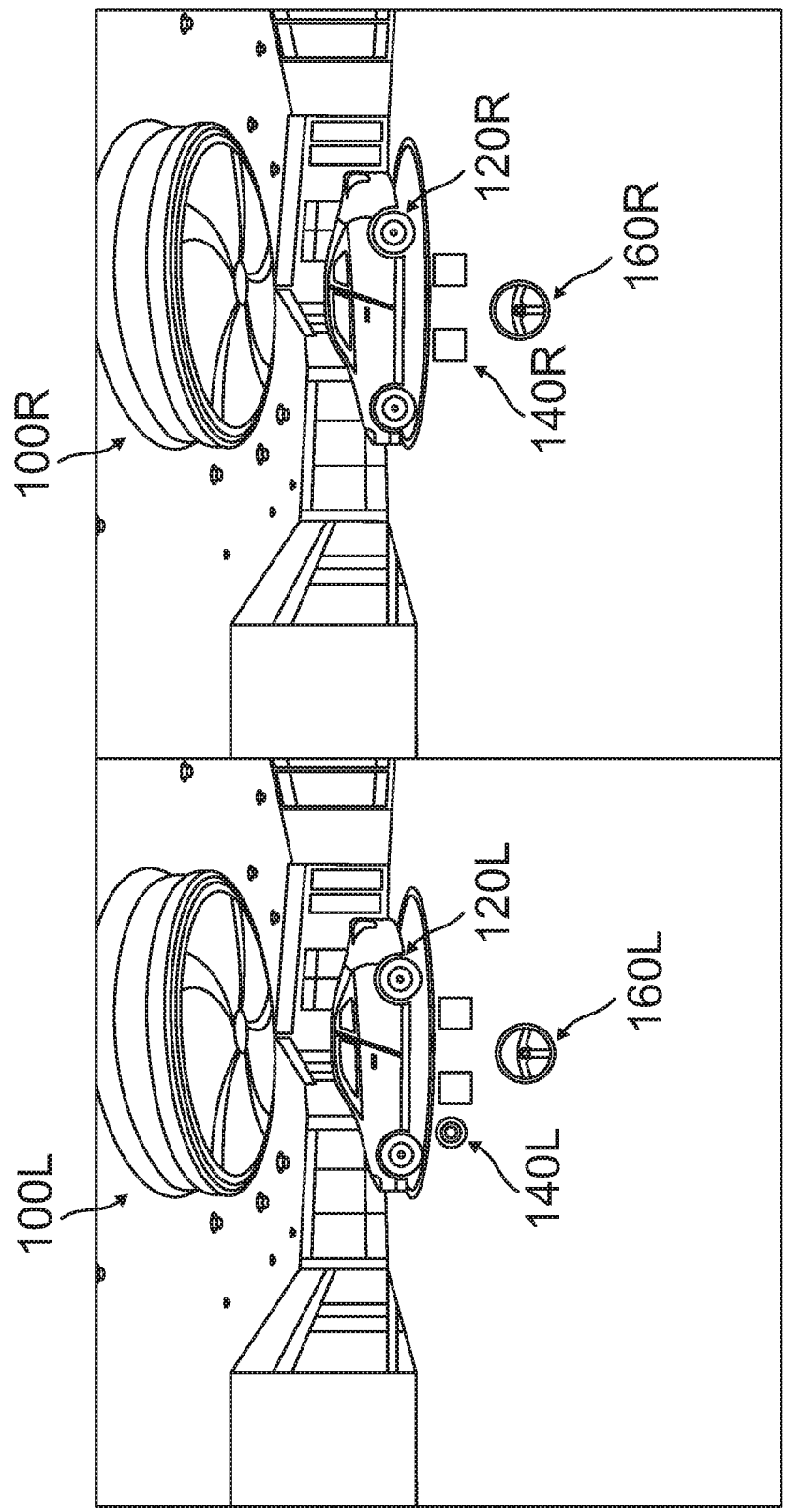
FIG. 2 is a side view of the virtual reality environment wherein the car has been rotated ⅛ turn in the clockwise direction with the view from the left eye on the left side and the view from the right eye on the right side.
Figure 3:
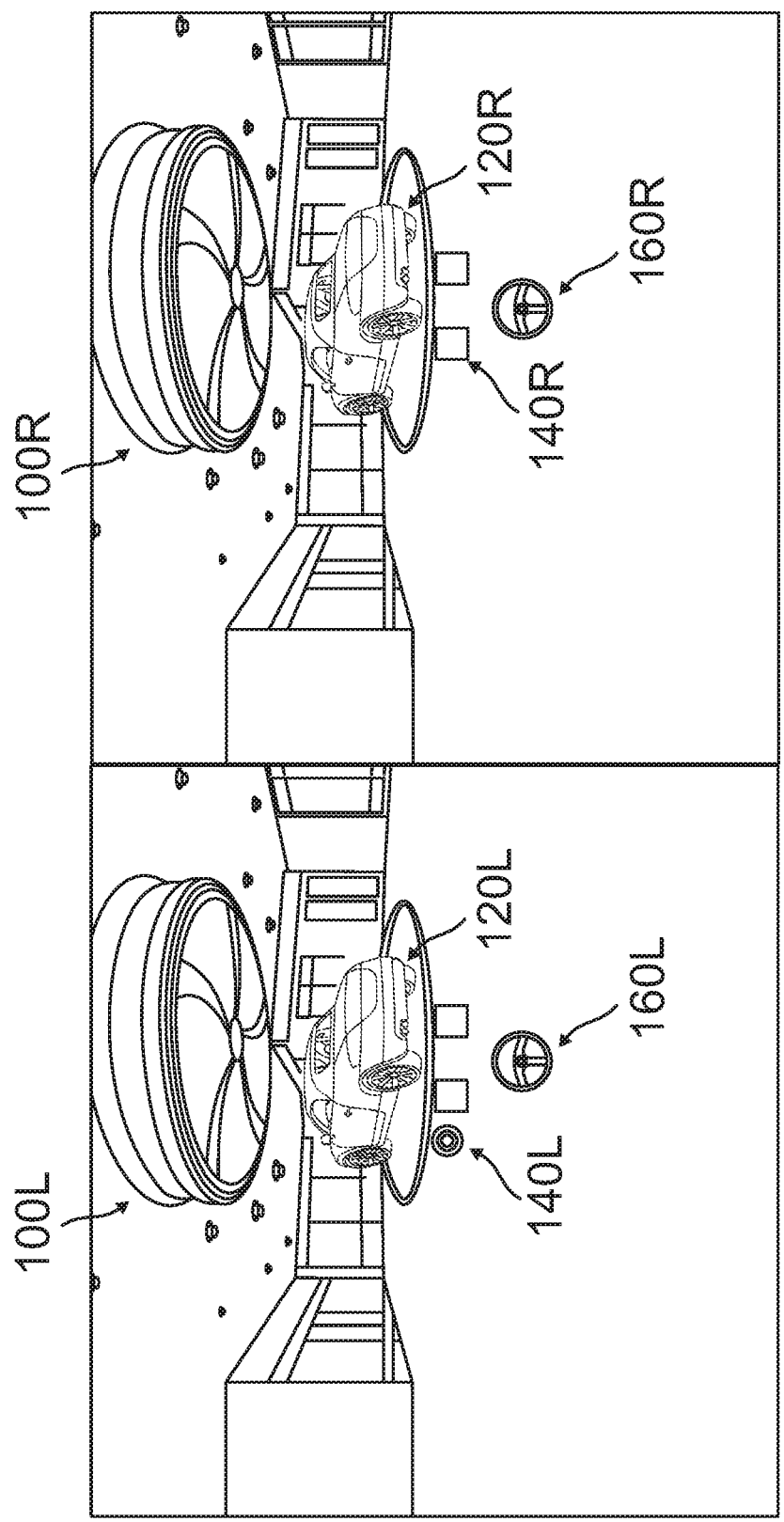
FIG. 3 is a side front view of the virtual reality environment wherein the car has been rotated 180 degrees in the clockwise direction from the view in FIG. 2 with the view from the left eye on the left side and the view from the right eye on the right side.
Figure 4:
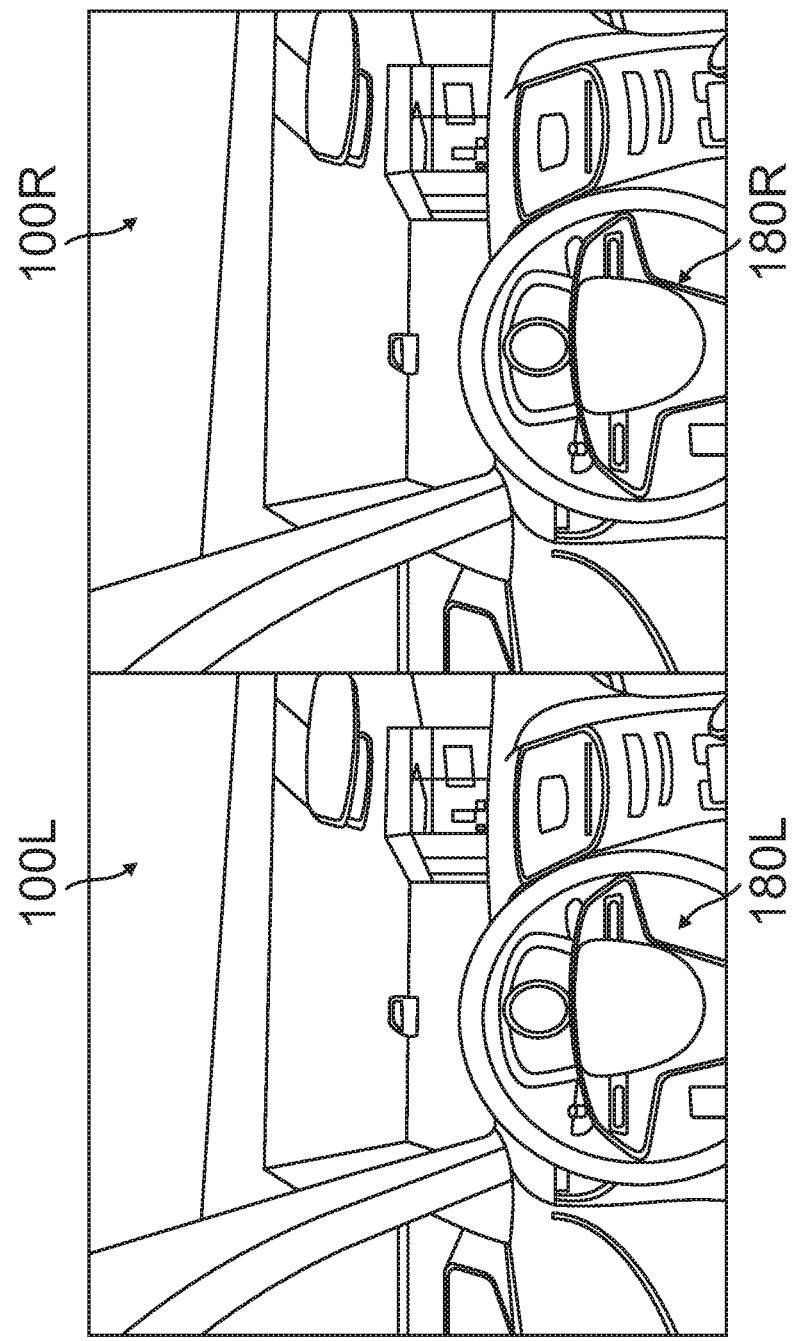
FIG. 4 is a front view of the inside of a car in a virtual reality environment with the car door icon visible on the car windshield, with the view from the left eye on the left side and the view from the right eye on the right side.
Figure 5:
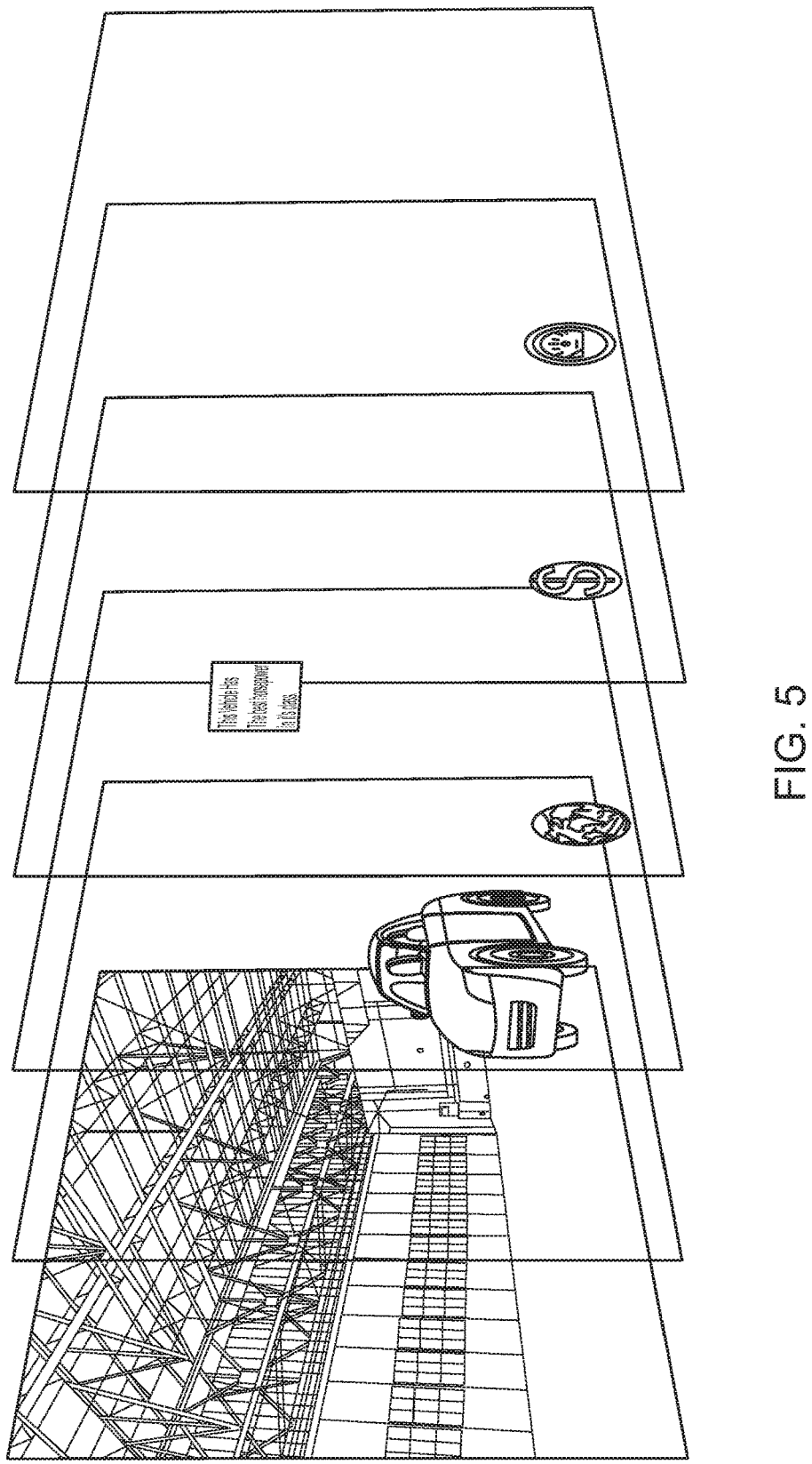
FIG. 5 is a perspective view of a sample virtual reality environment wherein the virtual reality environment appears in a series of layered screens.
Figure 6:
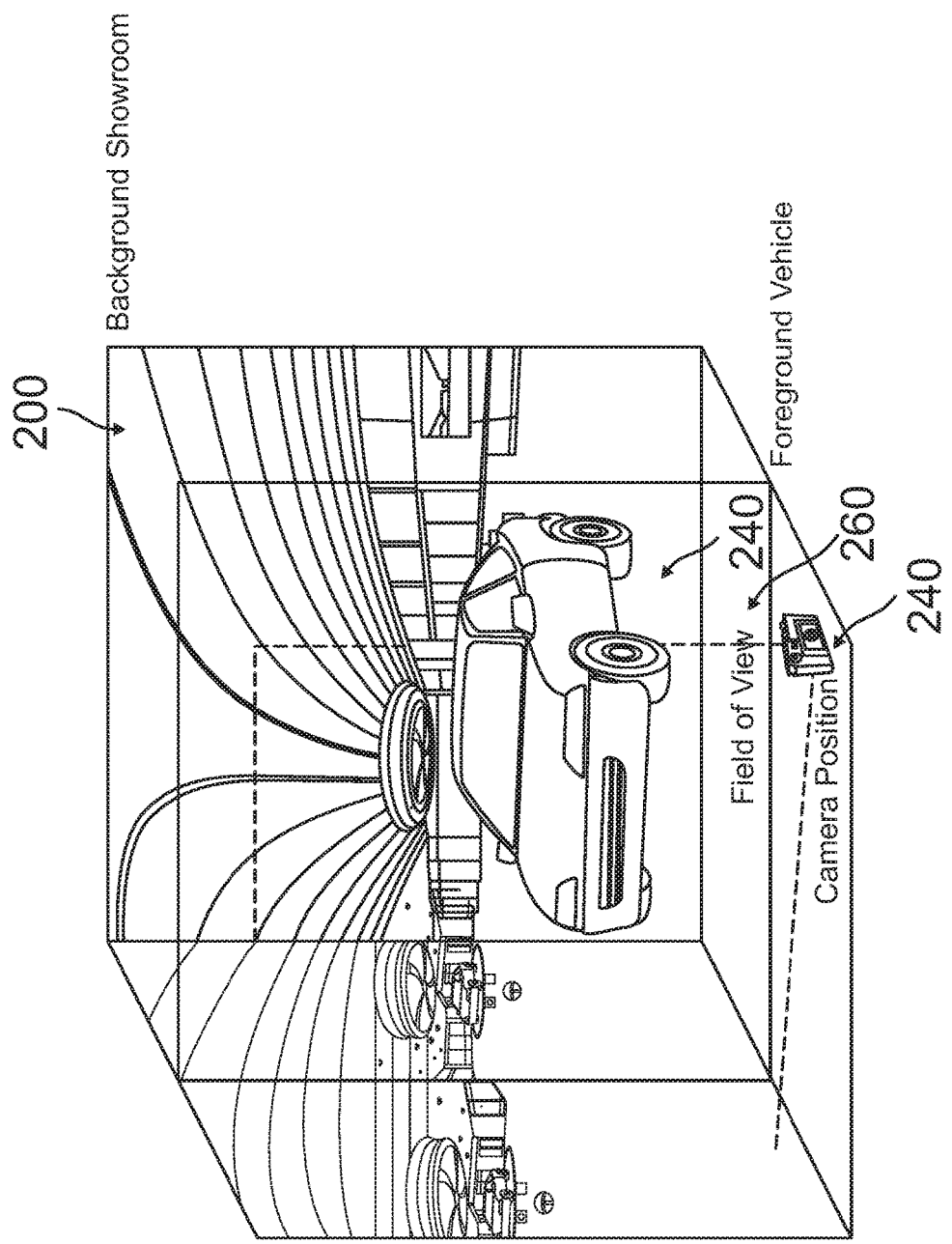
FIG. 6 is a front view of a sample car and a sample background in a sample virtual reality environment.
Figure 7:
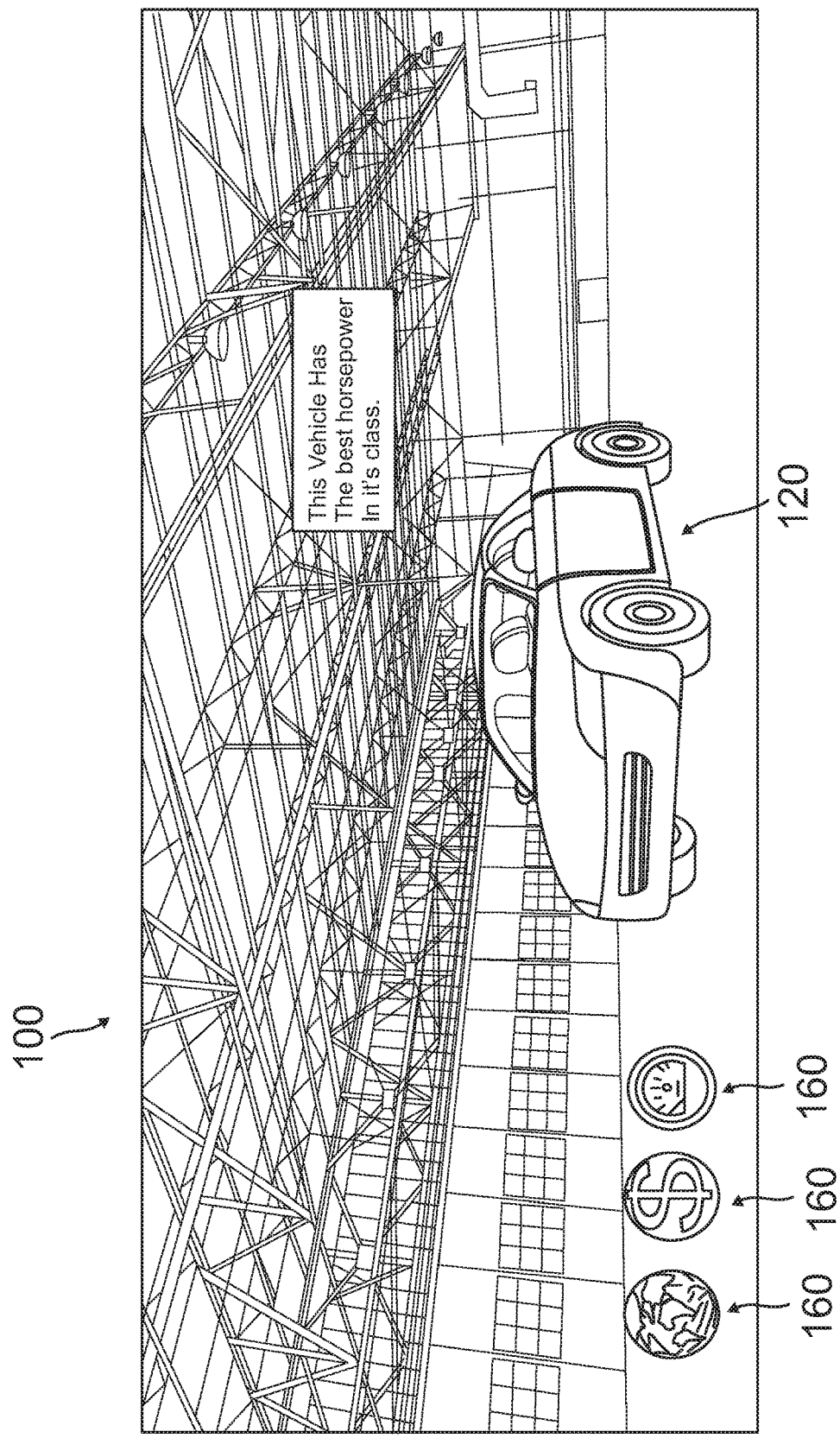
FIG. 7 is a front view of a sample virtual reality environment.
Figure 8:
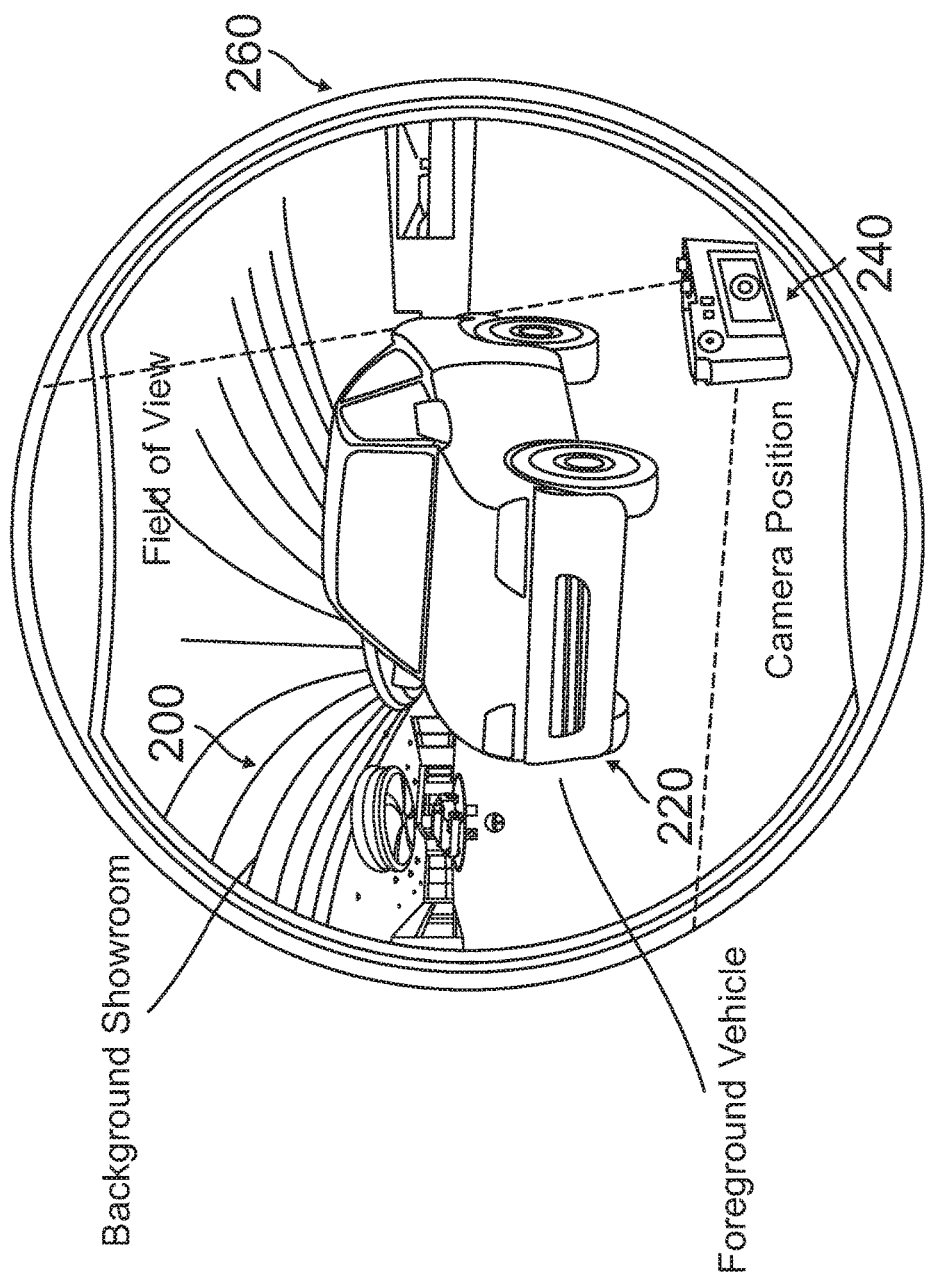
FIG. 8 is a front view of a sample car which would appear in a sample virtual reality environment.

Referring to FIGS. 5, 6, 7, and 8, in essence, the end results will look as if it's one panorama (as illustrated in FIG. 7) whereas in fact it's a base panorama of the environment with elements produced specifically and exactly to be layered on it for a seamless view (as illustrated in FIG. 5). Referring to FIGS. 6 and 8, there is illustrated the background showroom 200, the foreground of the vehicle 220, the camera position 240, and the field of view 260.

All visual items included in the experience must be produced with matching properties, such as camera angles, lighting, separation, stitching details for elements to be matched, aligned or otherwise uniform to allow for proper combination of the elements into layers used to form a panoramic image in 3D VR space.

The integration of the images and elements is achieved by:

1. Matching camera height, angle and relative lens diameter across all combined images—all images to be combined must be acquired from a camera or cameras at the same angle to the subject, at the same height to the subject, and using the same focal length lens.

2. Matching camera separation/interpupillary distance (IPD) across all combined images—All images to be combined must be produced with the same separation between stereo cameras, down to the millimeter for best results.

3. Matching lighting across all individually photographed and/or rendered elements—all images to be combined must be acquired under the same or similar lighting conditions.

4. Matching stitching, placement and registration of all photographed, produced and/or rendered elements. All images to be combined need to be produced such that when layered on top of each other, any panoramic stitching (blending of more than one image into a final image) and registration/placement (ensuring precise alignment for any spherical or cubic panorama) needs to match so that when combined, the total sum of images create one comprehensive panorama appropriate for viewing. For example, a car produced separately from an environment should look like it is sitting on the floor in the correct position of the environment.

Specifically for the HTML display, the present invention expands upon using the existing technology of a third party software, such as Pano2VR, and includes a virtual reality environment in which a user has nothing more than a web-capable device, such as a smart phone. The technologies unique to the present invention are as follows:

1. This experience will allow a user to "click" or select elements in the experience or virtual reality environment by visually lining up a centrally located "cursor" on the element for a specified amount of time. This is a "look to activate" functionality. The cursor animates to indicate to the user that an item is in the process of being selected and that a change will occur shortly.

2. The present invention incorporates a means of programmatically changing images, or "media elements" as they are referred to in some third party software, within the environment, based on a user's actions.

Key Benefits of the Present Invention:

The present invention provides the following benefits:

1. It allows pre-rendering of image content which results in high quality and high resolution content with relatively low file size, low computing requirements, and low bandwidth requirements.

2. It allows an interactive, VR experience via HTML web display, on devices capable of viewing web pages, and therefore allows integration of our unique content into mobile websites, etc.

3. It allows easy and repeatable exchange of background scenes and elements.

4. It facilitates integration of 2D elements that are more readily available and lower cost. Existing 2D elements can be converted to left and right eye stereo vision elements (ideally with drop shadows) and will appear as 3D objects even though they are 2D elements.

5. It allows for a fixed POV that promotes product review and evaluation for education, entertainment, product clinics, shopping consideration, etc. as it creates a unique ability to use pre rendered assets for high quality, product accurate and photo real display, including color changes and component/feature configuration, text, image and video overlays and use with other stereoscopic virtual reality content. The method does not limit the use of this unique content for viewing on any specific virtual reality head mounted display, but is rather designed to be used in any Head-mounted display application and SDK. This proprietary process utilizes pre-rendered images from a fixed point of view to enable product visualization and review, allowing the viewer to feel like they are in the car and can be immersed in the vehicle interior.

Figure 9A:
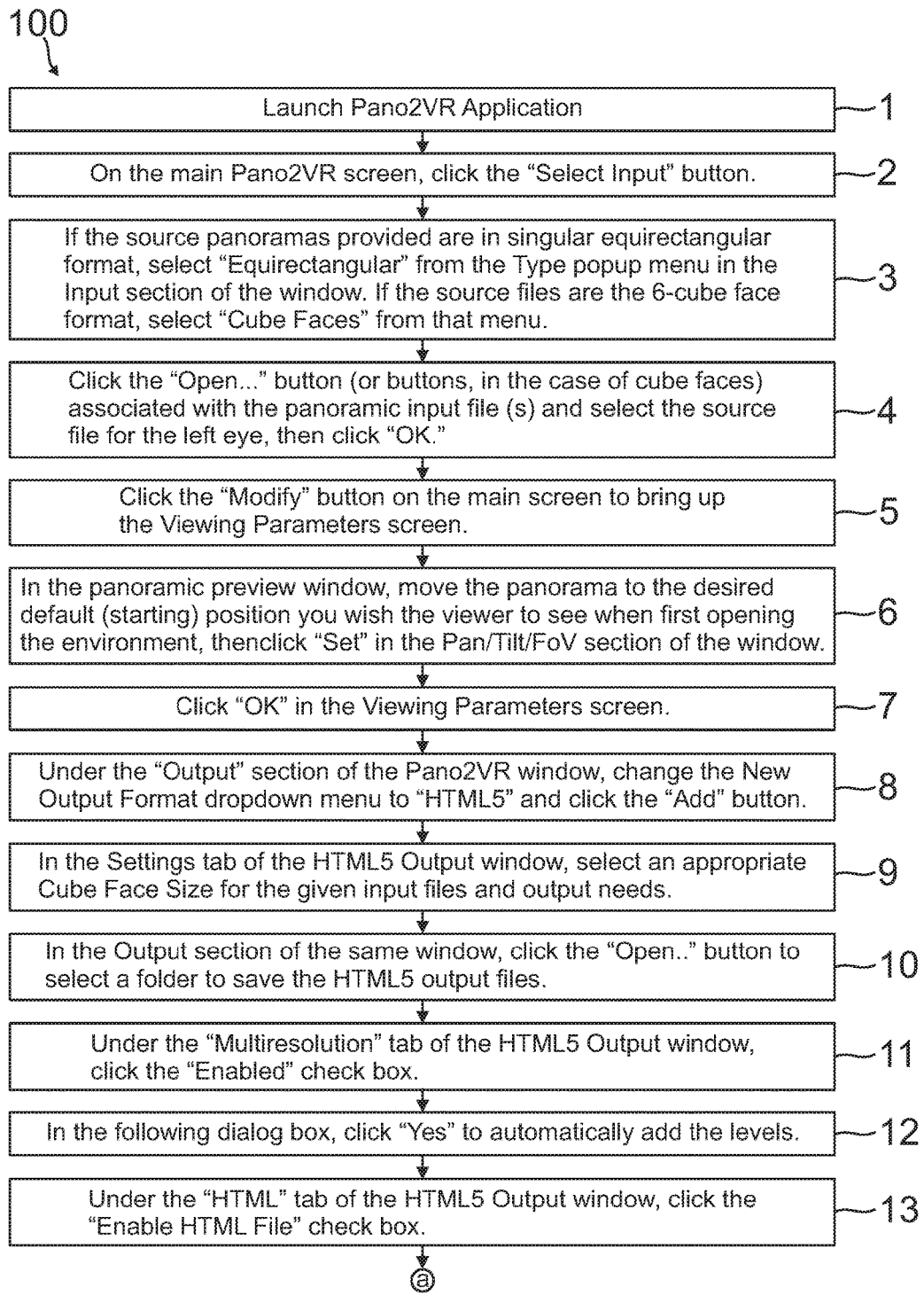
FIG. 9A is a flow chart depicting the process of converting the panoramic images and graphic user interface elements to HTML viewable files using the Pano2VR application for steps 1 through 13.
Figure 9B:
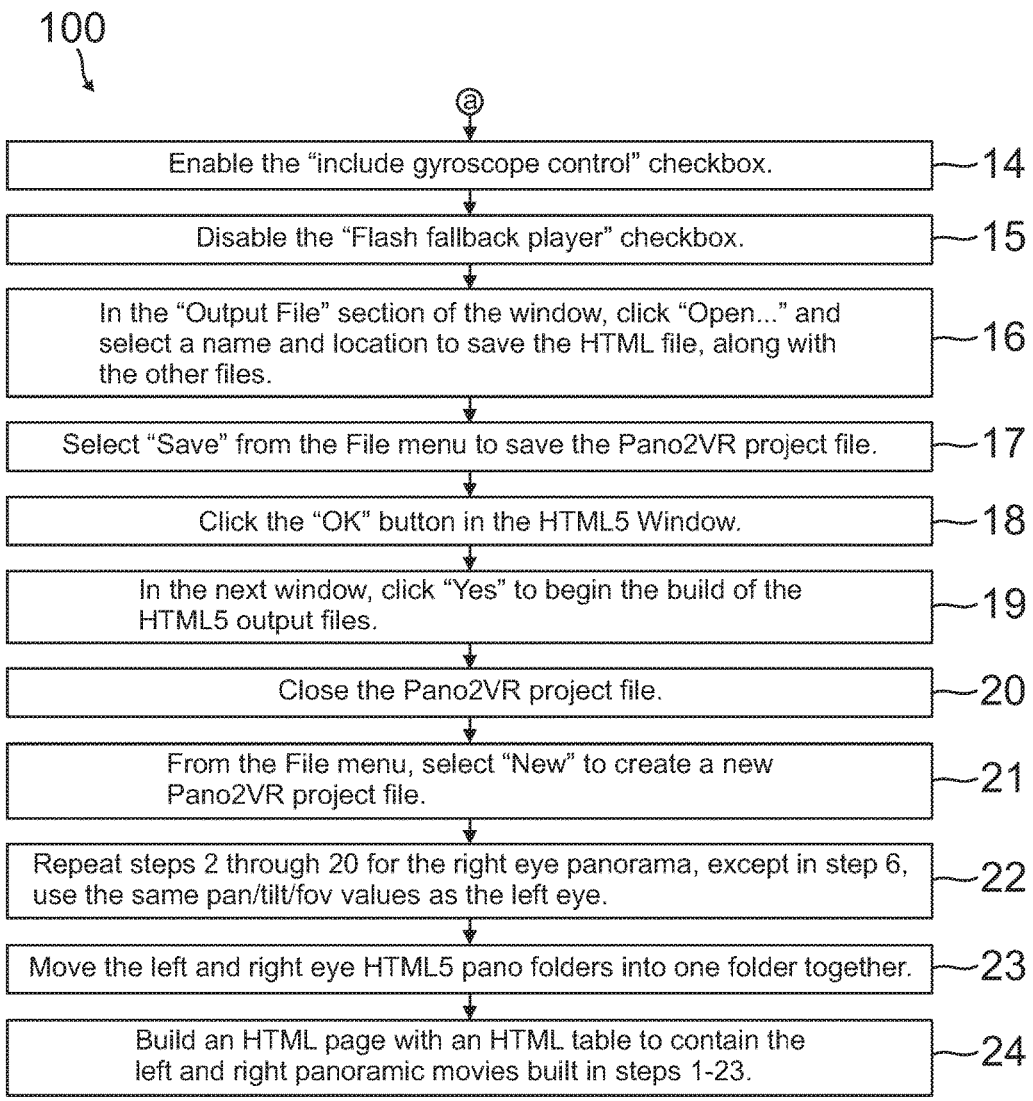
FIG. 9B is a flow chart depicting the process of converting the panoramic images and graphic user interface elements to HTML viewable files using the Pano2VR application for steps 14 through 24.

Referring to FIGS. 9A and 9B there is Illustrated the Detailed Process 100

1. Launch the Pano2VR application.
2. On the main P2VR screen, click the "Select Input" button.
3. If the source panoramas provided are in singular equirectangular format, select "Equirectangular" from the Type popup menu in the Input section of the window. If the source files are the 6-cube face format, select "Cube Faces" from that menu.
4. Click the "Open" button (or buttons, in the case of cube faces) associated with the panoramic input file(s) and select the source file for the left eye, then click "OK".
5. Click the "Modify" button on the main screen to bring up the Viewing Parameters screen.
6. In the panoramic preview window, move the panorama to the desired default (starting) position you wish the viewer to see when first opening the environment, then click "Set" in the Pan/Tilt/FoV section of the window.
7. Click "OK" in the Viewing Parameters screen.
8. Under the "Output" section of the Pano2VR window, change the New Output Format drop down menu to "HTML5" and click the "Add" button.
9. In the Settings tab of the HTML5 Output window, select an appropriate Cube Face Size for the given input files and output needs.
10. In the Output section of the same window, click the "Open" button to select a folder to save the HTML5 output files into.
11. Under the "Multiresolution" tab of the HTML5 Output window, click the "Enabled" check box.
12. In the following dialog box, click "Yes" to automatically add the levels.
13. Under the "HTML" tab of the HTML5 Output window, click the "Enable HTML File" check box.
14. Enable the "Include gyroscope control" checkbox.
15. Disable the "Flash fallback player" checkbox.
16. In the "Output File:" section of the window, click "Open" and select a name and location to save the HTML file, along with the other files.
17. Select "Save" from the File menu to save the Pano2VR project file.
18. Click the "OK" button in the HTML5 window.
19. In the next window, click "Yes" to begin the build of the HTML5 output files.
20. Close the Pano2VR project file.
21. From the File menu, select "New" to create a new Pano2VR project file.
22. Repeat steps 2 through 20 for the right eye panorama, except in step 6, use the same Pan/Tilt/FoV values as the left eye.
23. Move the left and right eye HTML5 pano folders into one folder together.
24. Build an HTML page with an HTML table to contain the left and right panoramic movies built in step 1. (sample code included)

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method for viewing pre-rendered image content from a fixed point of view on a virtual reality device, the method comprising:

a. matching camera height, angle and relative lens diameter across all combined images wherein all images combined are created from a camera having the same angle to the subject, at the same height to the subject, and using the same focal length lens;

b. matching camera separation across all combined images wherein all combined images combined are produced with the same separation between stereo cameras;

c. matching lighting across all individually photographed and rendered elements wherein all combined images are created using the same lighting conditions;

d. matching stitching, placement and registration of said photographed and rendered elements wherein all combined images result in one seamless panorama; and e. performing the sequential steps:
  i. Launch a Pano2VR application,
  ii. select a "Select Input" button from a main Pano2VR screen,
  iii. for panoramas in singular equirectangular format, select "Equirectangular" from a type popup menu in an Input section for Panoramas in 6-cube face format, select "Cube Faces" from a type popup menu,
  iv. select a "Open" button associated with a panoramic input file and select a source file for a left eye, then select "OK",
  v. select a "Modify" button on a main screen to open a viewing parameters screen, vi. in a panoramic preview window, move a panorama to the desired default (starting) position, then click "Set" in a Pan/Tilt/FoV section,
vii. click "OK" in the Viewing Parameters screen,
viii. change the New Output Format drop don menu to "HTML5" and click the "add" button,
ix. in the Settings tab of an HTML5 Output window, select a Cube Face Size large enough for input files and output needs,
x. click the "Open" button to select a folder to save at least one HTML5 output file into,
xi. under the "Multuresolution" tab of the HTML5 Output window, click the "Enabled" check box,
xii. in the following dialog box, click "Yes" to automatically add the levels,
xiii. under the "HTML" tab of the HTML5 Output window, click the "Enable HTML File" check box,
xiv. enable a "Include gyroscope control" checkbox,
xv. disable a "Flash fallback player" checkbox,
xvi. in the "Output File:" section of the window, click "Open" and select a name and a location to save the at least one HTML file,
xvii. select "Save" from a File menu,
xviii. click a "OK" button in the HTML5 Output window,
xix. in the next window, click "Yes" to begin a build of the HTML5 output files,
xx. close Pano2VR project file,
xxi. from the File menu, select "New" to create a new Pano2VR project file,
xxii. repeat steps 2 through 20 for a right eye panorama, except in step 6, use the same Pan/Tilt/FoV values as the left eye,
xxiii. move the left eye panorama and the right eye panorama into one folder together,
f. whereby, the user interactively selects said pre-rendered image content for viewing in HTML, Javascript, and XML.

2. The method in accordance with claim 1 further comprising: build an HTML page with an HTML table to contain the left and right panoramas created in element e of claim 1.

3. The method in accordance with claim 1 further comprising: a user selects an element in the virtual reality environment by lining up a centrally located cursor on the element for a specified period of time.

4. The method in accordance with claim 1 further comprising: said centrally located cursor animates to indicate to said user that the selection has occurred.

5. A method for viewing pre-rendered image content from a fixed point of view on a virtual reality device, the method comprising:
a. matching camera height, camera angle, camera relative lens diameter and camera separation across all combined images;
b. matching lighting across all individually photographed and rendered elements;
c. combining images into one seamless panorama; and
d. performing the sequential steps of:
i. Launch a Pano2VR application,
ii. select a "Select Input" button from a main Pano2VR screen,
iii. for panoramas in singular equirectangular format, select "Equirectangular" from a type popup menu in an Input section for Panoramas in 6-cube face format, select "Cube Faces" from a type popup menu,
iv. select a "Open" button associated with a panoramic input file and select a source file for a left eye, then select "OK",
v. select a "Modify" button on a main screen to open a viewing parameters screen,
vi. in a panoramic preview window, move a panorama to the desired default (starting) position, then click "Set" in a Pan/Tilt/FoV section,
vii. click "OK" in the Viewing Parameters screen,
viii. change the New Output Format drop don menu to "HTML5" and click the "add" button,
ix. in the Settings tab of an HTML5 Output window, select a Cube Face Size large enough for input files and output needs,
x. click the "Open" button to select a folder to save at least one HTML5 output file into,
xi. under the "Multuresolution" tab of the HTML5 Output window, click the "Enabled" check box,
xii. in the following dialog box, click "Yes" to automatically add the levels,
xiii. under the "HTML" tab of the HTML5 Output window, click the "Enable HTML File" check box,
xiv. enable a "Include gyroscope control" checkbox,
xv. disable a "Flash fallback player" checkbox,
xvi. in the "Output File:" section of the window, click "Open" and select a name and a location to save the at least one HTML file,
xvii. select "Save" from a File menu,
xviii. click a "OK" button in the HTML5 Output window,
xix. in the next window, click "Yes" to begin a build of the HTML5 output files,
xx. close the Pano2VR project file,
xxi. from the File menu, select "New" to create a new Pano2VR project file,
xxii. repeat steps 2 through 20 for a right eye panorama, except in step 6, use the same Pan/Tilt/FoV values as the left eye,
xxiii. move the left eye panorama and the right eye panorama into one folder together,
e. whereby, the user interactively selects said pre-rendered image content for viewing in HTML, Javascript, and XML.

6. The method in accordance with claim 5 further comprising: build an HTML page with an HTML table to contain the left and right panoramas created in element e of claim 1.

7. The method in accordance with claim 5 further comprising: a user selects an element in the virtual reality environment by lining up a centrally located cursor on the element for a specified period of time.

8. The method in accordance with claim 5 further comprising: said centrally located cursor animates to indicate to said user that the selection has occurred.

9. A method for viewing pre-rendered image content from a fixed point of view on a virtual reality device, the method comprising:
a. matching camera height, camera angle, camera relative lens diameter and camera separation across all combined images;
b. matching lighting across all individually photographed and rendered elements;
c. combining images into one seamless panorama; and
d. performing the sequential steps of:
i. launch software application,
ii. select panorama format,
iii. select button associated with a panoramic input file and select the source file for the left eye, iv. select button to open and view parameters,
v. move the panorama to the desired position for viewing,
vi. under the output section of the software, change output format to HTML5,
vii. select a size large enough for the given input files and output needs,
viii. select a folder to save the HTML5 output files into,
ix. select a name and location to save the HTML file, along with the other files,
x. save the software project file,
xi. build the HTML5 output files,
xii. close the software project file,
xiii. from the File menu, create a new software project file,
xiv. repeat steps 2 through 13 for the right eye panorama,
xv. move the left and right eye HTML5 panoramic folders into one folder together, e. whereby, the user interactively selects said pre-rendered image content for viewing in HTML, Javascript, and XML.

\* \* \* \* \*